United States Patent [19]

Soethout et al.

[11] Patent Number: 5,120,272
[45] Date of Patent: Jun. 9, 1992

[54] DISCHARGE NOZZLE FOR VENTILATING OR AIR CONDITIONING SYSTEMS

[75] Inventors: Freddie Soethout, Pulheim; Martin Prause, Coburg, both of Fed. Rep. of Germany

[73] Assignee: Siemens Aktiengesellschaft, Berlin & Munich, Fed. Rep. of Germany

[21] Appl. No.: 602,367

[22] Filed: Oct. 23, 1990

[30] Foreign Application Priority Data

Oct. 24, 1989 [EP] European Pat. Off. ............ 89119752

[51] Int. Cl.⁵ .......................... B60H 1/34; F24F 13/15
[52] U.S. Cl. ...................................... 454/155; 454/316
[58] Field of Search .................... 98/2, 40.24, 40.26, 98/40.27, 40.28

[56] References Cited

U.S. PATENT DOCUMENTS

| | | | |
|---|---|---|---|
| 2,586,997 | 2/1952 | Schach | 98/40.27 X |
| 2,630,053 | 3/1953 | Kennedy | 98/40.26 |
| 3,221,633 | 12/1965 | Sweeney | 98/40.24 X |
| 4,653,386 | 3/1987 | Hayakawa et al. | 98/40.24 X |

FOREIGN PATENT DOCUMENTS

| | | | |
|---|---|---|---|
| 2701816 | 7/1978 | Fed. Rep. of Germany | 98/2 |
| 2457190 | 1/1981 | France | 98/2 |
| 2081883 | 2/1982 | United Kingdom | 98/2 |
| 2196421 | 4/1988 | United Kingdom | 98/2 |

Primary Examiner—Harold Joyce
Attorney, Agent, or Firm—Kenyon & Kenyon

[57] ABSTRACT

A discharge nozzle has directional blades which can be swivelled about a swivel axis running parallel to the discharge-side front edge of a housing. The blades are swivelled by means of a coupling part, providing the directional blades with a common orientation. Diffused air flow through the discharge nozzle is selectively provided by diffusing insert blade segments which are insertable between the directional blades. The diffusing blades are part of a rigid diffusing grid, which is at least partially insertable from the back side of the directional blades between these blades and which is guided in a sliding manner in the nozzle housing by means of a rotary control button having a spiral guideway.

15 Claims, 3 Drawing Sheets

DISCHARGE NOZZLE FOR VENTILATING OR AIR CONDITIONING SYSTEMS

BACKGROUND OF THE INVENTION

The invention relates generally to discharge nozzles for use with ventilating or air conditioning systems and more particularly, to a discharge nozzle for use in automobiles in which air flow through the nozzle is directed by several directionally adjustable blades.

It is known to construct a turn-tilt-blade housing which swivels around a horizontal axis and in which perpendicularly configured directional blades are pivoted at their front edges about fixed vertical links at the front side of the turn-tilt blade housing. The trailing edges of the directional blades are interconnected by a coupling rod in such a way that when at least one directional blade is tilted, the remaining directional blades are also tilted sideways parallel to each other. Consequently, the conveyed air discharges as a directed compact jet flow out of the discharge nozzle along a direction set by the inclination of the directional blades, which may be axially straight or laterally deflected.

SUMMARY OF THE INVENTION

This invention is directed to the problem of further developing a discharge nozzle of the general type discussed above that also selectively provides a diffuse discharge of air.

The present invention represents an improvement in the above described device in that it selectively provides a diffused discharge of air, in addition to having a directional capability. Hence, by utilizing many existing components, using no extra installation space, and with little additional complexity, enhanced ventilation comfort is achieved. This is accomplished by means of diffusing partial insert blades which are insertable between the directional blades. Furthermore, this is accomplished in a manner that is particularly simple from a structural as well as from an engineering and service standpoint. The diffusing partial blades are components of a diffusing grid which is at least partially insertable between the directional blades from their back sides. Hence, this structure retains the basic form of a discharge nozzle having directional blades pivoted therein, particularly of the type having a turn-tilt-blade housing within which directional blades swivel around a vertical swivel axis. The diffused air flow is achieved by means of adding a simple component to the conventional turn-tilt-blade housing. In the case of a normal directional-jet air flow, this additional component is retained in the installation space available behind the inflow-side edges of the swivel blades. When a diffused air flow is desired, this component is inserted into the clearance space generally available between the swivelling vertical blades.

According to the invention, a rotary control button is provided as a control element for adjusting the diffusing jet characteristic. This rotary control button is rotatably mounted to one side of a turn-tilt-blade housing containing the swivelling directional blades. By means of this rotary control button, the diffusing grid is movable in a sliding manner from a first "off" position behind the directional blades during directional jet operation of the discharge nozzle, into an "on" position. In the "on" position, the diffusing blade segments are brought into the space between the directional blades of the housing and provide for a diffused discharge of air from the nozzle. A spiral guideway is provided in the rotary control button to compactly enable the actuation of the diffusing grid by its linearly displacing it in a sliding manner. A slaving journal on the diffusing grid mates with this spiral guideway. This slaving journal is linearly displaced within the sliding guideway as the diffusing grid is brought into play.

DETAILED DESCRIPTION

Figure 1:
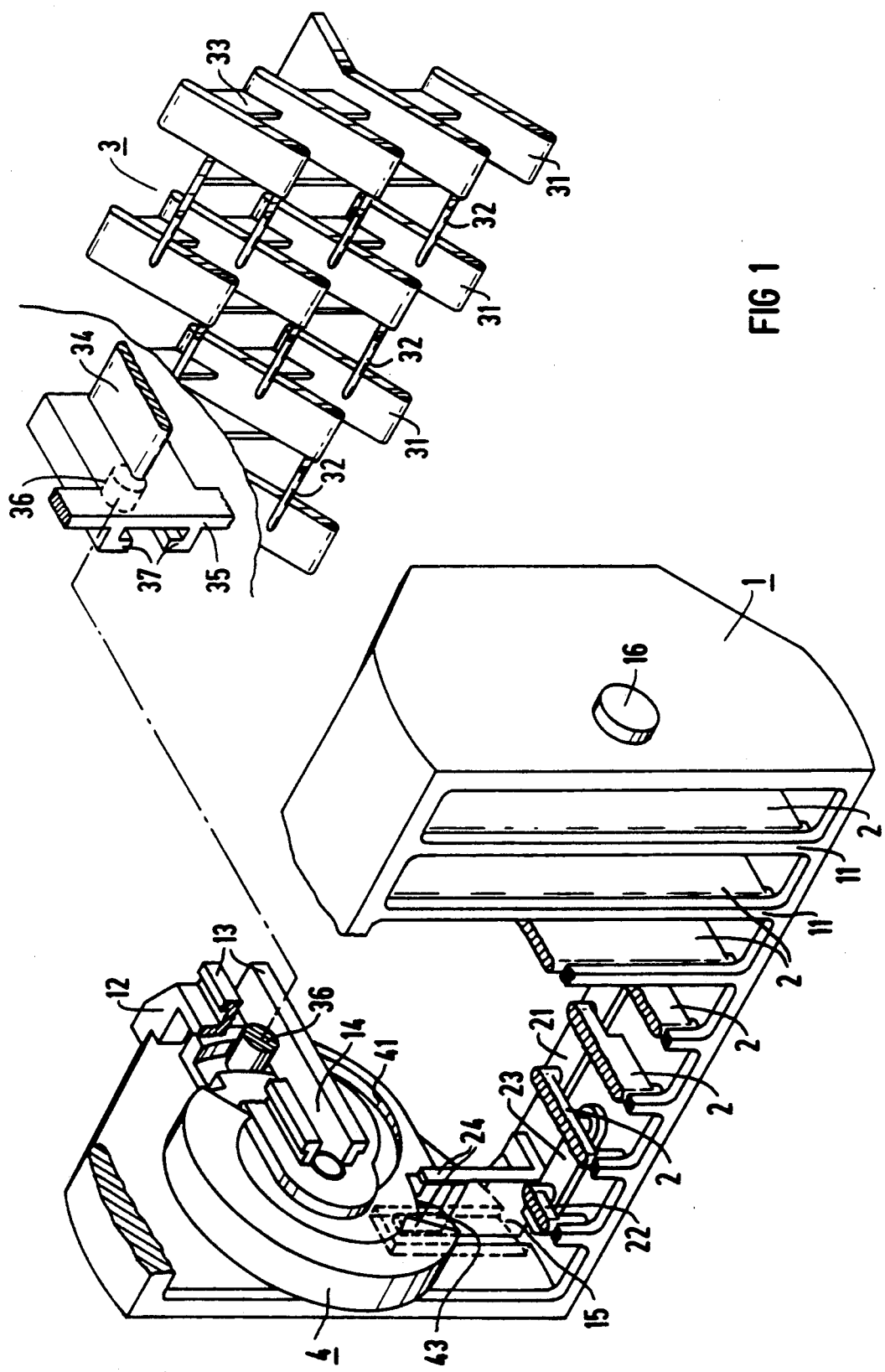
FIG 1. is a perspective, exploded view of a turn-tilt-blade housing constructed according to the principles of this invention.

In FIG. 1, a turn-tilt-blade housing 1 shown and is horizontally pivoted on lateral journals 16 in an outer housing 6. This housing may lead to an air outlet in the dashboard of a motor vehicle, and generally has an inflow-side throttle valve 5. Vertical links 11 run across the front side of the turn-tilt-blade housing 1. These vertical links 11 are fixed to the housing and are designed as vertical swivel axes for the directional blades 2 and 22. These directional blades are pivoted with their discharge-side front edges directly behind the vertical links 11. They are swivelled by means of coupling bars 21 and 23 in the vicinity of their inflow-side trailing edges. The coupling bars gang the directional blades in a common orientation so as to provide a compact jet flow having directional capability.

Figure 4:
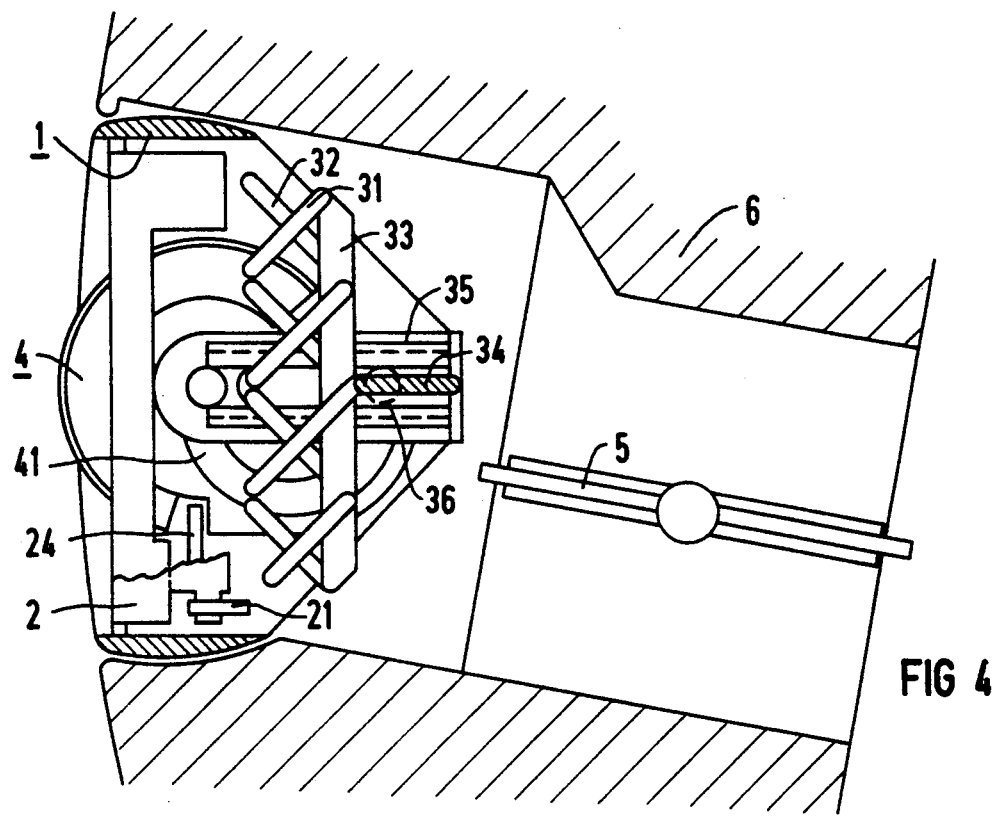
FIG. 4 shows the device according to FIG in a sectional profile between two directional blades, in which the diffusing grid is in its "off" (pushed back) position.
Figure 5:
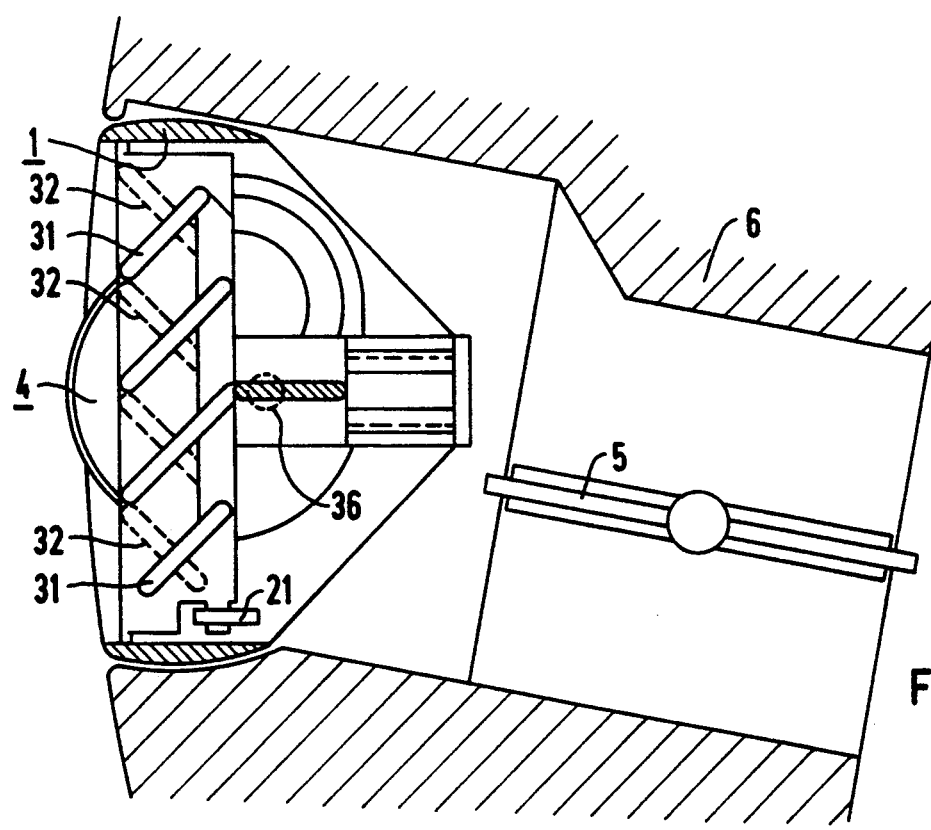
FIG. 5 shows the device according to FIG. 4 in which the diffusing grid is in its "on" (pushed forward) position.

To attain a jet having the additional characteristic of a diverging diffused discharge flow according to the invention, a diffusing grid 3 is provided in the installation space generally available between the inflow-side trailing edges of the directional blades (2 and 22) and the throttle valve 5. This diffusing grid 3 can be moved by means of a rotary control button 4 from its "off" position (depicted in FIG. 4) during compact-jet operation into an "on" position (depicted in FIG. 5) for diffused-flow operation.

The diffusing grid 3 is mainly comprised of rows of blades, alternately of insert blade segments 31 directed diagonally downwardly, and insert blade segments 32 directed diagonally upwardly. They are retained in the diffusing grid 3 by means of vertical braced links 33 and horizontal braced links 34. This configuration enables them to be pushed forward during diffused-flow operation (the "on" position) with their front free ends inserted into the clearance spaces between the straightly aligned directional blades 2 and 22, preferably up to the front edge of the discharge nozzle. When the diffusing grid is in the pushed-forward state, the air is discharged in accordance with the direction of the diffusing insert blade segments 31 and 32 in a stratified manner, directed out of the discharge nozzle both upwards and downwards. The individual air currents come into contact with each other between the layers, which results in a partially forwardly directed airflow. Thus, a diffusing flow pattern is provided which is efficiently filled-up and substantially fanned out.

Due to the wide clearance spaces, which were previously filled up by the vertical links 11, the diffusing insert blade segments 31 and 32 are circumflowed in the pushed-back state of the diffusing grid 3 with no air-guiding effect. This enables one to utilize the directional blades 2 and 22 to provide non-diffuse, directed air flow when the diffusing grid is in its retracted state.

The diffusing grid 3 is moved by means of a rotary control button 4 rotatably supported on the left side inner wall of the turn-tilt-blade housing 1. The rotary control button 4 has a spiral guideway 41 with which a slaving journal 36 of the diffusing grid 3 mates. The slaving journal 36 is also guided in a linear guide 14 of the turn-tilt-blade housing 1. A guide block 35 with guide bars 37, to which are assigned corresponding guide bars 13 on a guide block mounting 12 of the turn-tilt-blade housing 1, serves for the linear guidance of the diffusing grid 3.

Figure 2:
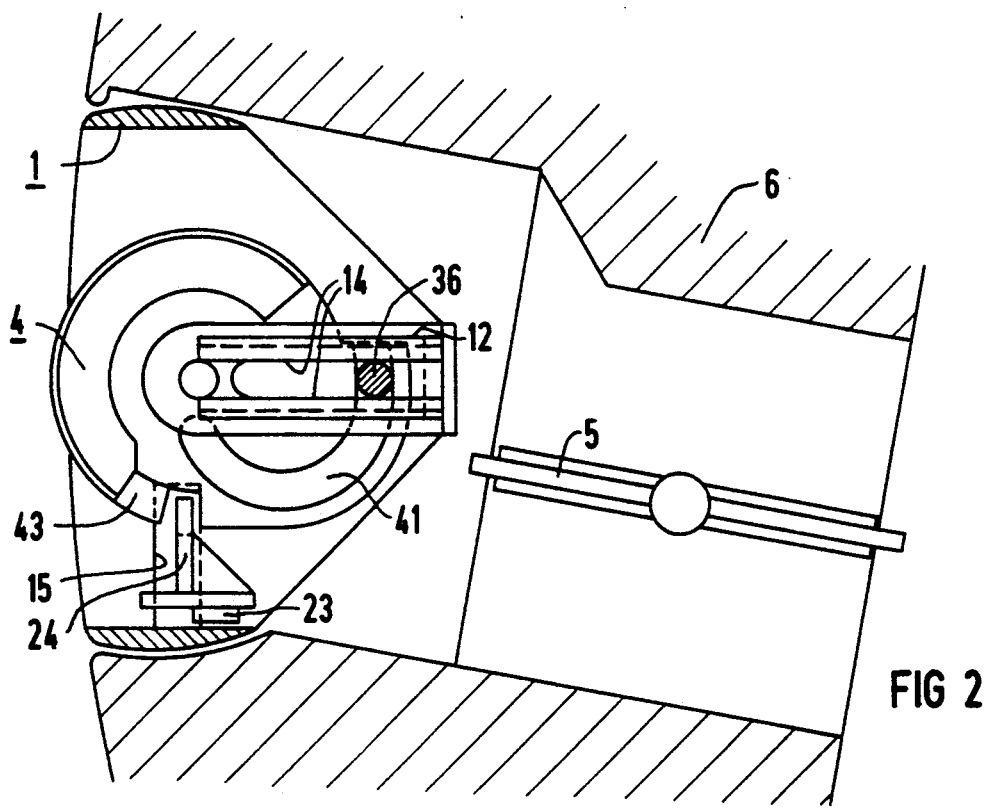
FIG. 2 shows the device according to FIG. 1 along a section taken between the rotary control button actuator and the adjoining directional blade, in which the diffusing grid is in its "off" (pushed back) position.
Figure 3:
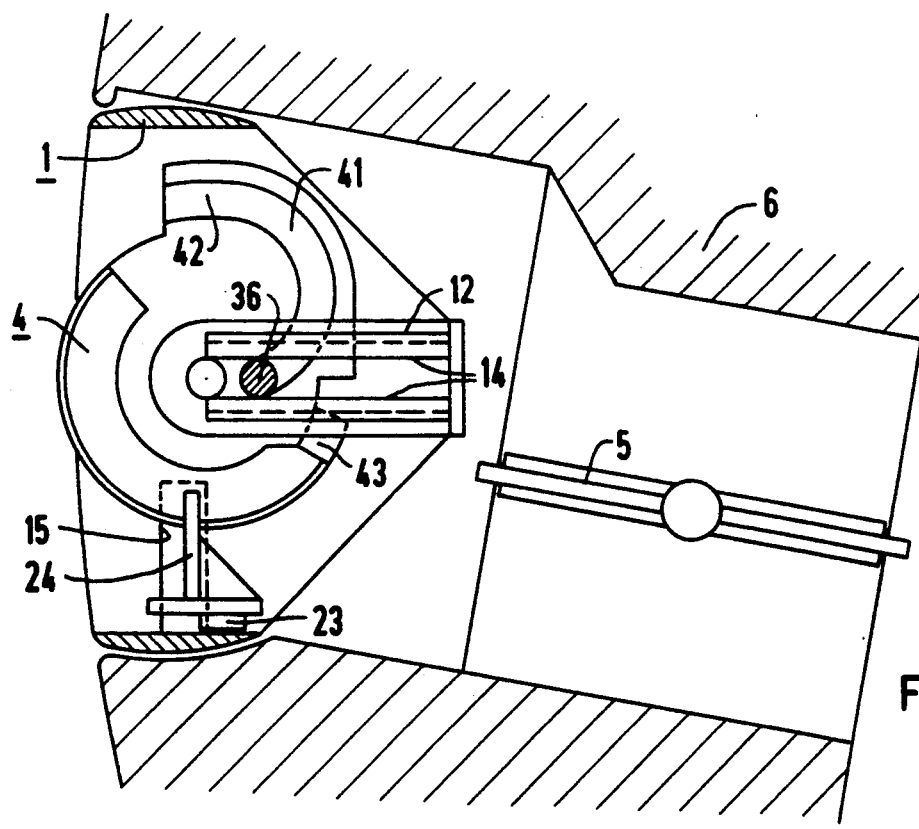
FIG. 3 shows the device according to FIG. 2 in which the diffusing grid is in its "on" (pushed forward) position.

The rotary control button 4 moves the diffusing grid 3 into and out of position in a simple and reliable manner. However, before the grid 3 can be inserted into the space between the directional blades, these blades must be straightened (i.e., aligned so that they are orthogonal to a plane across the front of the housing). To this end, a centering device is provided between the rotary control button 4 and the swivelling directional blades 2 and 22. This centering device serves to straighten the directional blades 2 and 22 before the diffusing grid 3 moves. According to the refinement shown in FIGS. 1-3, a centering cone 43 is premolded onto the rotary control button 4. Assigned to this centering cone 43 is a centering fork 24, which is connected via coupling bars 23 and 21 in the manner of a slaving relationship to the directional blades 2 and 22. When the rotary control button 4 is actuated and the directional blades 2 and 22 are in an inclined position, the centering cone 43 first runs against a fork arm of the centering fork 24 which has been moved to the left or right. The fork arm is thus displaced, which causes the displacement of the coupling rods and directional blades. In this manner, it brings the directional blades into a straightened position by means of the coupling rods 23 and 21.

To assure compactness of construction, a cut-out 15 in the left side of the turn-tilt-blade housing 1 is provided for the laterally movable centering fork 24. A shortened directional blade 22 is provided in the vicinity of the centering fork 24. This is connected in a slaving relationship via a coupling bar 23 to the adjoining, full length directional blade 2 and, via this, to the coupling bar 21 connecting all the remaining directional blades.

To assure that the diffusing grid 3 does not move during the centering operation, a movement dead time is advantageously provided for the diffusing grid 3. A circular guideway part 42 is supported in front of the spiral guideway 41 in such a way that the radius of this portion is constant within this guideway part 42. Thus, the slaving journal 36 is not immediately translated horizontally in its linear guide 14. Only when the entire width of the rotary control button 4 is introduced into the centering fork 24, is the diffusing grid 1 moved to the front in its slide guideway via the slaving journal 36 by means of the spiral guideway 41.

Accordingly, the instant invention provides a simple yet effective means for giving diffusional air flow capability to a discharge nozzle having directional capability.

What is claimed is:

1. A discharge nozzle for ventilating or air conditioning systems, comprising:
   a housing having fixed, spaced apart vertical links disposed across its front face;
   a plurality of spaced apart directional blades which are capable of being swiveled about said vertical links;
   coupling bars connecting the directional blades in a ganged relation so that a common swivel orientation of the directional blades is determined by the position of the coupling bars, thereby providing a means for imparting a directional quality to an air flow past said directional blades, and
   a plurality of diffusing blades that are selectively insertable into the gaps between the directional blades impart a diffuse character to an air flow flowing out of the nozzle.

2. The device of claim 1, wherein the diffusing blades are disposed as part of a rigid diffusing grid which is at least partially insertable between the directional blades from the back side of the directional blades.

3. The device of claim 2, wherein the housing is capable of being tilted about at least one axis; and wherein diffusing blades are arranged in rows so that they alternate between being directed in a diagonally upward direction and being directed in a diagonally downward direction.

4. The device of claim 3, comprising guide blocks, and a rotary control button acting as a side control element, for slidably moving the diffusing grid from a first off position in which the diffusing grid is located behind the directional blades and thus does not serve to impart a diffuse character to an air flow, to a second on position in which blades of the diffusing grid are at least partially located in between the directional blades so as to impart a diffuse character to the air flow.

5. The device of claim 4, further comprising a sliding guideway in which the diffusing grid is linearly movable; and
   wherein the rotary control button includes a spiral guideway and the diffusing grid includes a slaving journal adapted to be received within said spiral guideway.

6. The device of claim 5, further including a centering device for disposing the directional blades in a common orientation in which they are perpendicular to the front face of the nozzle housing in preparation for the insertion of the diffusing blades.

7. The device of claim 6, further comprising:
   a centering cone located on the rotary control button;
   a corresponding centering fork which is adapted to be displaced by the movement of the centering cone, said centering fork being connected to the coupling bars in a slaving relationship so that the displacement of the centering cone that results from the rotation of the rotary control button serves to displace the coupling bars by way of the centering fork and move the directional blades into proper alignment for receipt of the diffusing blades.

8. The device of claim 6, wherein the front of the spiral guideway includes a circular guideway section to delay the movement of the diffusing blades until the directional blades are in their proper aligned orientation.

9. The device of claim 1, wherein the nozzle is adapted for use in an automobile.

10. An air exhaust baffle, said baffle comprising:
an exterior housing having fixed, spaced apart vertical links disposed across its front face, said exterior housing being capable of being pivoted about at least one axis;
a plurality of air-directing blades which are capable of being swiveled about said vertical links;
coupling bars connecting the air-directing blades in ganged relation so that a common swivel orientation is imparted to the air-directing blades by the position of the coupling bars, thereby providing a means for imparting a directional quality to air flowing past said air-directing blades, and
a plurality of diffusing blades that are selectively insertable into the gaps between the air-directing blades to impart a diffuse character to an air flow flowing out of a nozzle.

11. The device of claim 10, wherein the diffusing blades are disposed as part of a rigid diffusing grid which is at least partially insertable between the directing blades from the back side of the directing blades, and wherein the diffusing blades are arranged in rows so that they alternate between being directed in a diagonally upward direction and being directed in a diagonally downward direction.

12. The device of claim 11, comprising guide blocks, and a rotary control button acting as a side control element, for slidably moving the diffusing grid from a first off position in which the diffusing grid is located behind the directing blades and thus does not serve to impart a diffuse character to an air flow, to a second on position in which blades of the diffusing grid are at least partially located in between the directing blades so as to impart a diffuse character to the air flow.

13. The device of claim 12, further comprising a sliding guideway in which the diffusing grid is linearly movable; and
wherein the rotary control button includes a spiral guideway and the diffusing grid includes a slaving journal and the rotary control button includes a spiral guideway adapted to be received within said spiral guideway.

14. The device of claim 13, further including a centering device to dispose the directing blades in a common orientation in which they are perpendicular to the front face of the nozzle housing in preparation for the insertion of the diffusing blades.

15. The device of claim 14, further comprising:
a centering cone located on the rotary control button;
a corresponding centering fork which is adapted to be displaced by the movement of the centering cone, said centering fork being connected to the coupling bars in a slaving relationship so that the displacement of the centering cone that results from the rotation of the rotary control button serves to displace the coupling bars by way of the centering fork and move the directing blades into proper alignment for receipt of the diffusing blades.

* * * * *